United States Patent Office 3,428,485
Patented Feb. 18, 1969

---

3,428,485
PAPER TREATED WITH ALKENYL FATTY ACID ESTER/ALPHA,BETA-OLEFINICALLY UNSATURATED POYCARBOXYLIC ACID INTERPOLYMER
Francis A. Bonzagni, Springfield, Mass., assignor to Monsanto Company, St. Louis, Mo., a corporation of Delaware
No Drawing. Filed Sept. 17, 1965, Ser. No. 488,265
U.S. Cl. 117—155
Int. Cl. B32b 27/04; D21h 3/44, 3/28
7 Claims

ABSTRACT OF THE DISCLOSURE

An ammonium salt of a lower alkenyl fatty acid monoester/alpha,beta-olefinically unsaturated polycarboxylic acid anhydride interpolymer which is useful in the preparation of treated paper.

---

This invention relates to the surface treatment of preformed paper webs with synthetic resins. More particularly, this invention provides methods for surface treating paper webs with particular water dispersible resins, which impart improved properties such as moisture, ink, lactic acid, and food juice resistances, as well as improved opacity and printing properties when applied to paper in starch or proteinaceous, and pigment coating compositions.

It is an object of this invention to provide methods for improving the properties of paper for various uses by treating the paper with water dispersible synthetic interpolymers. It is a further object of this invention to provide paper products coated or impregnated with aqueous dispersions containing interpolymers of normally hydrophobic materials.

Lower alkenyl fatty acid ester copolymers have been made for use in surface coatings such as in paint coatings. However, such copolymers have always had to be dispersed and applied in organic solvents such as toluene, xylene, petroleum naphthas, etc. However, such organic polymer solutions are both expensive and not suited for use on paper applications to impart desired properties to the treated paper. This invention provides a means for obtaining more economical and water dispersible interpolymers of the alkenyl fatty acid esters which are readily adaptable for use in various paper treating compositions.

Briefly, the objects set forth above are accomplished by treating the paper web with an aqueous dispersion of an amine salt, preferably an ammonium salt of a lower alkenyl fatty acid ester/alpha,beta-olefinically unsaturated polycarboxylic acid anhydride interpolymer. The aqueous interpolymer salt dispersion may be applied alone, e.g., as a surface size to the paper web. It may also be applied in combination with starch or protein materials as a starch or protein size modifier to improve the effectiveness of the starch or protein size, or it may be applied as the binder or as a constituent of the binder adhesive in pigment coating compositions to improve the printing qualities of the paper.

As indicated above the ammonium salt of the interpolymer is preferred but various other amine salts of the interpolymer may be used in place of part or all of the ammonium salt groups. "Amine salt" is used herein as a general term of convenience to include the use not only of ammonia and the ammonium salt but also salts derived from primary, secondary, and tertiary monoamines having no more than about 9 carbon atoms per molecule of amine which form salts of the interpolymer being used. Examples of useful amines which may be used include lower alkylamines, dialkylamines, and trialkylamines such as methylamine, ethylamine, hexylamine, nonylamine, diethylamine, dibutylamine, trimethylamine, tripropylamine, the cycloalkylamines such as cyclopropylamine cyclopentylamine, cyclohexylamine, alkenylamines, such as allylamine, diallylamine, etc., aromatic amines such as aniline, 4-methylaniline, and mixed aliphatic aromatic amines such as benzyldimethylamine, and such amines containing non-interfering substituents. A non-interfering substituent is one which does not react under the conditions of preparing the water dispersible salt with the amino groups of the amine used or with the interpolymer which is being treated with the amine to form the salt. Some such useful substituted amines are the alkyl, cycloalkyl, aryl, aralkylamines substituted with alkyl, halogen, formyl, carboxyl, sulfonyl, lower alkoxyl, lower carboalkoxyl, lower acyl. Examples of such useful substituted amines include 4-chloroaniline, 2,4-dibromoaniline, 3-iodoaniline, pentachloroaniline, 2-chloroethylamine, 4-bromobutylamine, 2-iodopropylamine, 3,5-dichlorobenzylamine, p-aminobenzoic acid, 3-aminobenzaldehyde, 4-methoxyaniline, 3-methylsulfonylpropylamine, 4-carbomethoxybutylamine, 4-methylcyclohexylamine, etc. The description of the invention will proceed describing the salt form of the interpolymer as the ammonium salt or as the "ammoniated" interpolymer. But it is to be understood that other equivalent amine salts could be used.

In paper sizing applications the lower alkenyl fatty acid ester/alpha,beta-olefinically unsaturated polycarboxylic acid anhydride polymer may be dispersed in aqueous ammonium hydroxide to form the salt of the respective polymeric polycarboxylic acid, or treated with anhydrous ammonia and then dispersed in water. The resulting ammoniated interpolymer solution may then be applied directly to the paper web by known methods, such as by tub sizing, or spray application techniques. When so applied the ammoniated interpolymer may be diluted to any desired concentration. It is generally desirable to provide solutions containing from about 0.5% to about 25% of the ammoniated interpolymer although more concentrated solutions may be made from lower molecular weight polymers.

The ammoniated interpolymer may be admixed dry or as an aqueous solution with starch or proteinaceous materials for modification of the starch or protein properties on paper. Although any desired proportions may be used it is generally contemplated to mix from about 1% to about 95% of the ammoniated interpolymer with the starch or protein, based on the weight of the starch or protein to which it is added. The ammoniated interpolymer may be cooked with the starch, or as is preferred the ammoniated interpolymer aqueous solution is mixed with the starch after cooking.

In pigment binding applications the ammoniated interpolymer is generally added as an aqueous solution or dispersion to a similar dispersion of the pigment component and any other binder ingredient such as a starch product or protein. In such mixtures with pigmented compositions the ammoniated interpolymer will generally be present in amounts ranging from about 5 to about 95% by weight based on the weight of the starch or protein material with which it is used. It may also be used as the only binder mixed with the pigment dispersion for the coating of paper.

The interpolymers used in this invention may be prepared by any conventional technique. Usually the polymerizable alkenyl fatty acid ester and maleic anhydride or other suitable equivalent are combined in approximately equimolar proportions with a suitable dialkyl peroxide catalyst and warmed to reaction temperature. Generally an aromatic hydrocarbon such as toluene or xylene is added to dilute the reactants and to act as a chain transfer agent. Generally, with dialkyl peroxides as catalysts or initiators, temperatures on the order of from about 120° to about 170° are used, with temperatures of from about 130° to 160° C. being preferred. Reaction times will vary from about 0.5 to 100 hours depending upon the reaction temperature, whether a solvent is used, etc.

When the polymerization is completed the reaction mixture is usually stripped to remove at least a part of any unreacted alkenyl fatty acid ester or anhydride reactants together with most of any solvent which was used. The resin product which remains as residue may then be poured or otherwise removed from the reaction vessel, and upon cooling to room temperature, it solidifies to a soft to glassy solid depending upon the comonomers used.

The interpolymer solids are made water soluble or at least water dispersible when ammoniated or treated with an equivalent amine as described above, and mixed with water on the basic side of the pH range. The concentration of the ammoniacal or amine base used may vary considerably and should be low enough to avoid precipitation of the interpolymer from aqueous media. When ammonium hydroxide is used, the preferred practice is to slurry the pulverized solid resin into most (say, 75–90%) of the required amount of water to obtain the desired percent solids solution and while stirring, add the required amount of concentrated ammonium hydroxide to effect solution or homogeneous dispersion, by heating somewhat, if necessary. A convenient amount of ammonium hydroxide to use is between about 0.5 and 0.6 ml. of concentrated (28%) ammonium hydroxide per gram of resin used. The percent solids in the solutions can be adjusted by adding water. The pH should be kept above about 7.5 to 8.5 for the higher solids content (15% to 25%) solutions to prevent precipitation.

The aqueous basic solution of the interpolymer, thus obtained may be applied to paper as such or there may be incorporated into the aqueous solution other additives or modifiers before it is applied to the paper. Such materials which may be found desirable include anti-foaming agents and/or defoaming agents, e.g., trialkyl phosphates such as tributyl phosphate, sulfonated tallow waxes, liquid fatty acid mineral oils, as well as various commercial materials sold for their antifoaming or defoaming properties in amounts ranging from a few parts per million to about 0.5 or 1 percent of the anti-foam or de-foam agent based on the weight of the interpolymer.

In more detail, the alkenyl fatty acid ester/alpha,beta-olefinically unsaturated polycarboxylic acid anhydride interpolymers which are useful for this invention are interpolymers of one or a mixture of lower alkenyl esters of fatty acid mono-esters having from 2 to about 4 carbon atoms in the alkenyl ester group and an average of at least about 9 and up to about 40 carbon atoms in the fatty acid moiety of the ester comonomer with one or more alpha,beta-olefinically unsaturated polycarboxylic acid anhydrides having from 4 to about 10 carbon atoms per molecule. The interpolymers have molecular weight ranging from about 1,000 to about 25,000. They desirably are prepared so as to contain about equimolar amounts of each type of comonomer although they can be prepared so as to contain about 0.9:1 to about 1.8:1 of the alpha,beta-unsaturated polycarboxylic acid comonomer to the alkenyl fatty acid comonomer. The best comonomers appear to contain substantially alternating units from the alkenyl fatty acid ester and the alpha,beta-olefinically unsaturated polycarboxylic acid anhydride comonomers. The formation of such interpolymers is aided by adding the anhydride to the ester comonomer over a period of from 1 to about 6 hours while heating and stirring the mixture in the presence of the catalyst and diluent. Examples of such polymerizable alkenyl fatty acid esters are the vinyl, allyl, and 1-butenyl esters of nonanoic, decanoic, undecanoic, dodecanoic, tridecanoic, tetradecanoic, pentadecanoic, hexadecanoic, heptadecanoic, octadecanoic, nonadecanoic, eicosanoic, docosanoic, tricosanoic acids. The alkenyl fatty acid esters may be derived from straight or branched chained materials. Mixtures of alkenyl alkanoates may be used. Thus, this invention involves the use of lower alkenyl esters of acids derived from natural oils as linseed oil, cottonseed oil, castor oil, olive oil, safflower oil, palm oil, coconut oil, fish oils, chinawood oils, peanut oil, oiticica oil and soybean oil. The fatty acids contained in such oils, all of which are generally designated as glyceride oils, will usually contain from 12 to 18 or more carbon atoms and include caprylic acid, lauric acid, stearic acid, palmitic acid, oleic acid, linoleic acid, linolenic acid, ricenoleic acid, and the like. Fatty acids from non-glyceride sources such as tall oil and the like can also be used. The resulting polymer may thus be an interpolymer of two or more alkenyl fatty acid esters and one or more alpha,beta-olefinically unsaturated polycarboxylic acid anhydride.

The preferred alpha,beta-olefinically unsaturated polycarboxylic acid anhydride comonomer for this invention is maleic anhydride. Other related materials could also be used in place of part or all of the maleic anhydride including aconitic acid anhydride, itaconic acid anhydride, citraconic acid anhydride, maleic acid, fumaric acid, lower alkyl half-esters of maleic acid such as the half-methyl and half-ethyl esters of maleic acid.

Papers obtained from any of the conventionally prepared pulps may be treated in accordance with this invention, e.g. sulfite, sulfate, rag stock papers, and papers containing pigment fillers such as clay, titanium dioxide, etc. The paper may be any cellulose containing base stock including waterleaf, slack-sized, or hard sized-webs. The paper web treated in accordance with this invention may also be papers made from fibers derived at least in part from synthetic linear polymer materials such as the polyamide, polyester, polyolefin, regenerated cellulose, and metal particle containing webs for specialty use applications.

The invention is further illustrated by the following detailed examples.

Example 1

This example illustrates how the alkenyl fatty acid ester/alpha,beta-olefinically unsaturated polycarboxylic acid interpolymers used in this invention may be prepared.

A mixture of 162 g. (0.050 mole) of allyl stearate, 49 g. (0.50 mole) of maleic anhydride and 1.0 ml. of di-tert-butyl peroxide was warmed in a 500 ml. round bottom flask. The two-phase system which resulted was diluted with 100 g. of toluene and heated to reflux (about 133° C.) under a condenser. Heating was continued 25 hours at 133° C.–125° C. After this time the reaction mixture was stripped by heating it on an oil bath at 220°–225° C. and 0.6 torr. The allyl stearate/maleic anhydride interpolymer remained as a residue. Upon cooling it was a soft, brittle solid weighing 180 g. It was soluble in toluene and in hexane.

The following is an example of a procedure by which the interpolymer, prepared as described above, may be solubilized in water for use as a surface size in accordance with this invention.

Weigh 10 parts of the interpolymer into a suitable vessel and add about 40 to 45 parts of water. Start agitating the mixture and add immediately ammonia solution equivalent to the polymer (about 0.535 ml. of 28% aqueous ammonia per gram of polymer). Stir the resulting mixture for 10 minutes, heat to 60 to 70° C. and hold at this temperature for another 20 minutes. After solution or homogeneous dispersion of the polymer has been effected make it basic to phenol-phthalein paper by adding ammonia solution as necessary. For a polymer solids solution of about 15% enough water is added to bring the total weight to about 66.7 parts. A 10% polymer solution was prepared using 10 g. of allyl stearate/maleic anhydride polymer, and 3.0 ml. of 28% ammonium hydroxide in 100 ml. of solution. The final pH was 8.8 and the viscosity of the solution was less than 50 centipoises.

Aqueous ammoniated interpolymer solutions prepared as described above are impregnated into paper sheets by applying the polymer solution to the paper with a brush. The wet treated paper is dried and is found to have substantially superior resistances to penetration by ink and lactic acid test solutions, as compared with untreated control papers tested in the same manner.

Example 2

This example illustrates the use of the ammoniated alkenyl fatty acid/alpha,beta-olefinically unsaturated polycarboxylic acid interpolymer derivatives as an adhesive for clay coating compositions for coating of paper.

A clay composition (a clay "slip") was prepared by mixing 200 g. of Georgia kaolin clay, 86 g. of water, and 2.0 g. of trisodium pyrophosphate, used as a dispersing agent. This was accomplished by dissolving the pyrophosphate in the water in a Hamilton-Beach mixer, and then adding the clay slowly to the stirred solution and then stirring for 5 minutes.

A 25% starch solution was prepared by adding 150 g. of a hydroxyethylated corn starch ("Penford Gum 380") to 450 g. of cold water with stirring, and heating to 90° C. and stirring for 20 minutes.

A coating composition was formulated to contain 53 g. of the above clay slip, 26 g. of the starch solution, and 3.25 g. of polymer solids, in the form of a 10% polymer solids aqueous solution of an ammonium salt of an allyl stearate/maleic anhydride copolymer, said polymer solution (10 g. of anhydride resin in 100 ml. of solution, ammoniated with 3.0 ml. of ammonium hydroxide, had a pH of 8.8, and a viscosity of less than 0.50 posie). The formulation ("coating color") had a pH of 8.5, and a 42 percent total solids content. It was applied to one side of a standard paper sheet. The coating weight applied was 8.0 pounds per 1000 sq. feet of paper surface. The Brookfield viscosity of this coating color composition was substantially lower than the viscosity of similar clay coating compositions (55% solids) containing the starch alone.

| Formulation | Brookfield Viscosity (cps.) at (r.p.m.) | | | |
|---|---|---|---|---|
| | 6 | 12 | 30 | 60 |
| Clay-Starch | 30,000 | 23,000 | 11,400 | 6,800 |
| Clay-Starch-ASMA.NH$_4$ | 5,000 | 3,000 | 1,600 | 1,000 |

The coated papers were dried in air for 72 hours. Other samples were aged for 5 minutes at 100° C. and tested for wet rub resistance.

The wet rub ratings were as follows:

| Coating Formulation | Wet Rub Rating | |
|---|---|---|
| | Air Dried, 72 hrs. | 5 Minutes, 100° C. |
| Clay-Starch | E | E |
| Clay-Starch-ASMA.NH$_4$ | C | B |

In the wet rub rating test the degree of resistance to rub off of the coating from the coated paper is rated as being A, B, C, D, or E where these letters are defined as follows:

A=Very excellent coating
    B=Good coating
    C=Average coating, acceptable
    D=Poor coating, not acceptable
    E=Very poor coating

What is claimed is:

1. A paper web treated with an ammonium salt of a lower alkenyl fatty acid mono-ester/alpha,beta-olefinically unsaturated polycarboxylic acid anhydride interpolymer having at least about 9 carbon atoms in said fatty acid moiety of said ester and from 4 to about 10 carbon atoms in said alpha,beta-olefinically unsaturated polycarboxylic acid anhydride, wherein the molar ratio of the anhydride to the alkenyl fatty acid mono-ester in the interpolymer is from about 0.9:1 to about 1.8:1.

2. A treated paper web as described in claim 1 wherein the ammonium salt of the interpolymer is that of allyl stearate/maleic anhydride.

3. A cellulosic web treated as described in claim 1 wherein the ammonium salt of the alkenyl fatty acid mono-ester/alpha,beta-olefinically unsaturated polycarboxylic acid anhydride is mixed with starch.

4. A paper web coated with a composition comprising starch and from about 1% to about 95% based on the weight of the starch of an ammonium salt of a lower alkenyl fatty acid ester/alpha,beta-olefinically unsaturated polycarboxylic acid anhydride interpolymer having at least about 9 carbon atoms in said fatty acid moiety of said ester, and from 4 to about 10 carbon atoms in said alpha,beta-olefinically unsaturated polycarboxylic acid anhydride, the molar ratio of the anhydride to the alkenyl fatty acid ester in the interpolymer being from about 0.9:1 to about 1.8:1.

5. A coated paper web as described in claim 4 wherein the ammonium salt of the interpolymer is that of allyl stearate/maleic anhydride.

6. A coated paper product comprising a paper base sheet having a coating on at least one surface of said paper base sheet, said coating comprising particles of a mineral pigment, and a composition comprising starch and from 5 to about 90% by weight, based on the weight of the starch, of an ammonium salt of a lower alkenyl fatty acid mono-ester/alpha,beta-olefinically unsaturated polycarboxylic acid anhydride interpolymer, having at least 9 carbon atoms in the fatty acid moiety of said ester, and from 4 to about 10 carbon atoms in said alpha,beta-olefinically unsaturated polycarboxylic acid anhydride, the molar ratio of the anhydride to the alkenyl fatty acid mono-ester in the interpolymer being from about 0.9:1 to about 1.8:1.

7. A coated paper product as described in claim 6 wherein the mineral pigment is a kaolin clay and the ammonium salt of the interpolymer is that of allyl stearate/maleic anhydride.

References Cited

UNITED STATES PATENTS 3,211,681  10/1965  Arakawa et al. _____ 117—161
3,259,596  7/1966  Downer et al. _____ 260—17.4

WILLIAM D. MARTIN, *Primary Examiner.*

M. LUSIGNAN, *Assistant Examiner.*

U.S. Cl. X.R.

117—156, 161, 164, 165; 260—17.4, 78.5